Patented May 8, 1934

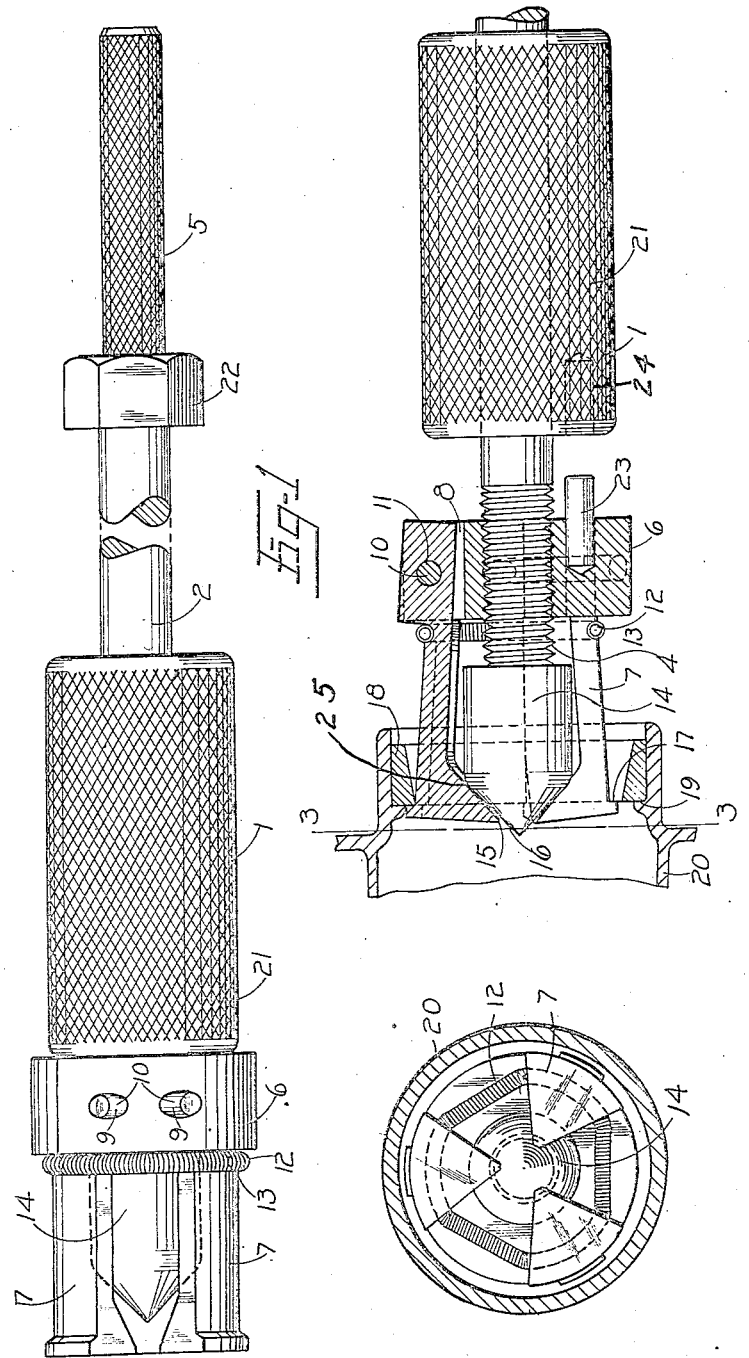

1,958,330

UNITED STATES PATENT OFFICE 1,958,330

RACE PULLER

Lawrence O. Beard, Lancaster, Pa.

Application June 26, 1933, Serial No. 677,714

1 Claim. (Cl. 29—88.2)

My invention relates to race pullers for removing ball bearing races and the like from wheel hubs, axle housings and the like.

The invention has for its general object to provide a race puller of strong simple construction which can be easily applied to and effectively used for removing a ball bearing race from its housing.

Other objects and advantages of the invention will be apparent from the following specification considered in connection with the accompanying drawing, in which:

Figure 1 is a plan view of the tool showing the expansible jaws in retracted position;

Figure 2 is a plan view partly in section showing the tool applied to a ball bearing race in the hub of a wheel; and Figure 3 is an end view of the tool showing the spring means for holding the jaws in place.

Referring more particularly to the drawing 1 denotes a tool comprising an elongated cylindrical body portion or mandril 2, having a threaded portion 4 at its outer end and a knurled portion 5 at its inner end.

Threadedly mounted on the threaded portion 4 is an adjustable cylindrically shaped collar or head 6 in which a plurality of fingers 7, preferably three in number are pivotally mounted. The lower enlarged inner ends of these fingers seat in radially disposed slots 8, and are locked therein for limited rocking or pivotal movement therein by means of pins 9 extending through slots 10 in the collar 6 and slots 11 in the fingers. These pivot pins may be driven out with a suitable tool should it become necessary to remove the fingers for any reason.

Fingers 7 are normally maintained in the retracted or axially aligned position with respect to the axis of body 2 as illustrated in Figure 1, by means of a coil spring 12, which seats in grooves 13 formed in the fingers slightly forward of their pivotal connection with the collar 6. Outward or expansive movement of the fingers is effected by means of a head member 14, screwed tightly upon threaded portion 4 of body portion 2, when the tool is rotated in a clockwise direction. The straight inner faces of the outer ends of fingers 7 are beveled at an angle of about forty five degrees, as at 15, for engagement with the curved portion 25 of the head member 14, while shoulders 17 formed on the outer faces of the fingers engage behind the ball bearing race 18 when the fingers are expanded. The general practice is to press these races 18 tightly to a seat 19 in the end of a wheel hub 20, or the like, as indicated in Figure 2, of the drawing, and consequently it is almost impossible to remove them without the use of a specially designed tool.

A centrally bored heavy preferably cylindrical ramming member 21 is slidably and rotatably mounted upon the mandril or body 2. This member is adapted to impact a stop nut 22 when manually actuated for the purpose of shocking the race loose from its seat.

The method of operation is as follows: After the fingers 7 have been inserted in the end of hub 20, with the shoulders 17 beyond the inner end of race 18, the workman grasps handle 5 with one hand and member 21 with the other hand. Mandril 2 is now manually rotated in a clockwise direction thus advancing the mandril and causing the beveled head 14 fixed thereto to engage the correspondingly beveled faces 15 of the fingers 7. As this movement is continued the fingers expand until shoulders 17 engage behind the inner end of race 18. Member 21 is held against rotary movement during this operation by means of a pin 23 carried by collar 6, which fits within a short bore or recess 24 formed in the inner end of said member 21. When the fingers have been securely wedged behind the race, member 21 is successively slid into impacting engagement with stop nut 22 until the race is jarred loose and removed. Spring 12 holds the fingers closely to the expander or head 14 and limits their outward movement to that imparted by the head 14. Consequently all danger of the shoulders 17 becoming caught on irregular parts of the hub or other housing for the race is obviated.

It will be noted that the curved surface 25, formed at the point of juncture between the body of head member 14, and the conical outer end 16 of the latter provides a line contact between the head and the inner straight beveled faces 15 of the fingers, which contact causes the expansive force of head 14 to be transmitted evenly and equally to the individual fingers 7, when the mandril is rotated and the head forced outwardly through the said fingers. This expansive force is on a horizontal line parallel with the axis of pivot pins 9 and is transmitted through the fingers in a direct horizontal line to a point coincident with or directly adjacent the race engaging shoulders 17. Consequently there is no danger of the fingers slipping or breaking. Furthermore, as power is applied at a point below the pivotal mounting of the fingers little or no strain is borne by pivot pins 12.

Having thus described my invention, what I claim is:

A ball bearing race puller comprising a body portion, a collar rotatably mounted upon and a stop member fixed to said body, a shocker member slidably mounted between said collar and stop member, a beveled head fixed to the outer end of said body, a plurality of fingers pivoted at their inner ends to said collar and engaged by said head, shoulders on the outer faces of the outer ends of said fingers for engaging the race when said fingers are expanded, means on the inner faces of the outer ends of said fingers cooperating with means on said head for transmitting expansive force from said head to a point on said fingers in a direct line with or immediately below said shoulders, and means in said collar and shocker for preventing relative angular movement between the collar and the shocker.

LAWRENCE O. BEARD.